UNITED STATES PATENT OFFICE.

CARL IMMERHEISER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

AZO DYE AND PROCESS OF MAKING SAME.

No. 914,144.  Specification of Letters Patent.  Patented March 2, 1909.

Application filed October 19, 1908. Serial No. 458,441.

*To all whom it may concern:*

Be it known that I, CARL IMMERHEISER, doctor of philosophy and chemist, subject of the King of Bavaria, residing at Ludwigshafen-on-the-Rhine, Germany, have invented new and useful Improvements in Azo Coloring-Matter and Processes of Making Same, of which the following is a specification.

I have discovered a new insoluble orange azo coloring matter by combining diazotized primulin with 1.3-dihydroxyquinolin.

My new coloring matter is preferably produced on the fiber, when orange shades of excellent fastness against the action of washing, acid and light are obtained.

I carry out my invention for instance by treating in a diazotizing bath in the usual manner 100 parts of the material which has been dyed with two parts of primulin and then passing the material through an aqueous solution of one part of the 1.3-dihydroxyquinolin, employed in the form of its disodium salt, and one and one-half parts of calcined soda.

My new coloring matter, whether in the presence or absence of the fiber, is insoluble in water and on treatment with tin and hydrochloric acid it loses its orange shade becoming yellow and yields amino-2.3-dihydroxyquinolin.

Now what I claim is:

1. The process of producing orange shades on the fiber by treating the fiber which contains diazotized primulin with 1.3-dihydroxyquinolin.

2. As a new article of manufacture the coloring matter obtainable by combining diazotized primulin with 1.3-dihydroxyquinolin which is insoluble in water and on treatment with tin and hydrochloric acid loses its orange shade becoming yellow and yields amino-1.3-dihydroxyquinolin.

In testimony whereof I have hereunto set my hand in the presence of two subscribing witnesses.

CARL IMMERHEISER.

Witnesses:
J. ALEC. LLOYD,
JOS. H. LEUTE.